United States Patent [19]
Greenburg

[11] 3,750,351
[45] Aug. 7, 1973

[54] MOBILE HOME PORCH
[76] Inventor: Jesse J. Greenburg, 506 W. 5th St., Solomon, Kans. 67480
[22] Filed: June 8, 1972
[21] Appl. No.: 260,739

[52] U.S. Cl............ 52/64, 52/143, 52/182, 280/34 R
[51] Int. Cl. .............................. B60r 27/00
[58] Field of Search............ 52/143, 182, 183, 52/64, 79; 280/34 R, 163; 214/38 B, 38 BB

[56] References Cited
UNITED STATES PATENTS

| | | | |
|---|---|---|---|
| 2,173,076 | 9/1939 | Stetson | 52/143 X |
| 2,247,340 | 6/1941 | Webster | 52/79 |
| 3,195,190 | 7/1965 | Malo | 52/79 X |
| 3,348,345 | 10/1967 | Byers et al. | 52/79 |
| 3,578,110 | 5/1971 | Seagraves | 52/182 UX |
| 3,605,351 | 9/1971 | Vredevoogd | 52/64 X |
| 3,608,951 | 9/1971 | Jackson | 52/64 X |

Primary Examiner—Price C. Faw, Jr.
Attorney—Miller & Brown

[57] ABSTRACT

A portable porch for use with a mobile home having a flat deck surrounded by removable railing members, the flat deck being slidably attached to the frame of the trailer in a lateral direction to assist in positioning the deck in abutting relation with the mobile home, the porch having a secondary function as a conventional flat bed trailer.

8 Claims, 7 Drawing Figures

PATENTED AUG 7 1973 3,750,351

PATENTED AUG 7 1973

MOBILE HOME PORCH

BACKGROUND OF THE INVENTION

In the past, porch structures for mobile homes have been either non-existent or very small in size since they are not portable and must be constructed at the site. For obvious reasons, an owner would not construct a substantial porch structure which he would have to leave at the site when the mobile home is moved.

SUMMARY OF THE INVENTION

The present invention provides a substantial porch and step structure which is highly mobile in that it is carried on the frame of a two-wheel trailer. In transit, the porch structure functions as a conventional flat bed trailer for hauling any type of item such as the permanent support structure for the mobile home, and its removable apron which encloses the under space of the trailer. The porch structure is simply located by merely positioning the trailer in side-by-side relation with the mobile home and then sliding the deck of the porch laterally on the trailer until it comes in contact with the mobile home. The deck is then locked in place and the jacks at each corner of the porch are lowered into contacting relation with the ground while the stair structure is pivoted downward into contact with the ground.

It is therefore the principal object of the present invention to provide a mobile porch and stair structure for use with mobile homes.

Another object of the present invention is to provide a portable porch structure having a secondary function as a flat bed trailer to assist in household moving.

A further object of the present invention is to provide a mobile porch structure for mobile home use which is readily adaptable to a variety of configurations and uses.

The invention and its various objects and advantages will be more clearly understood when the following description is read in connection with the accompanying drawings in which.

Figure 1:
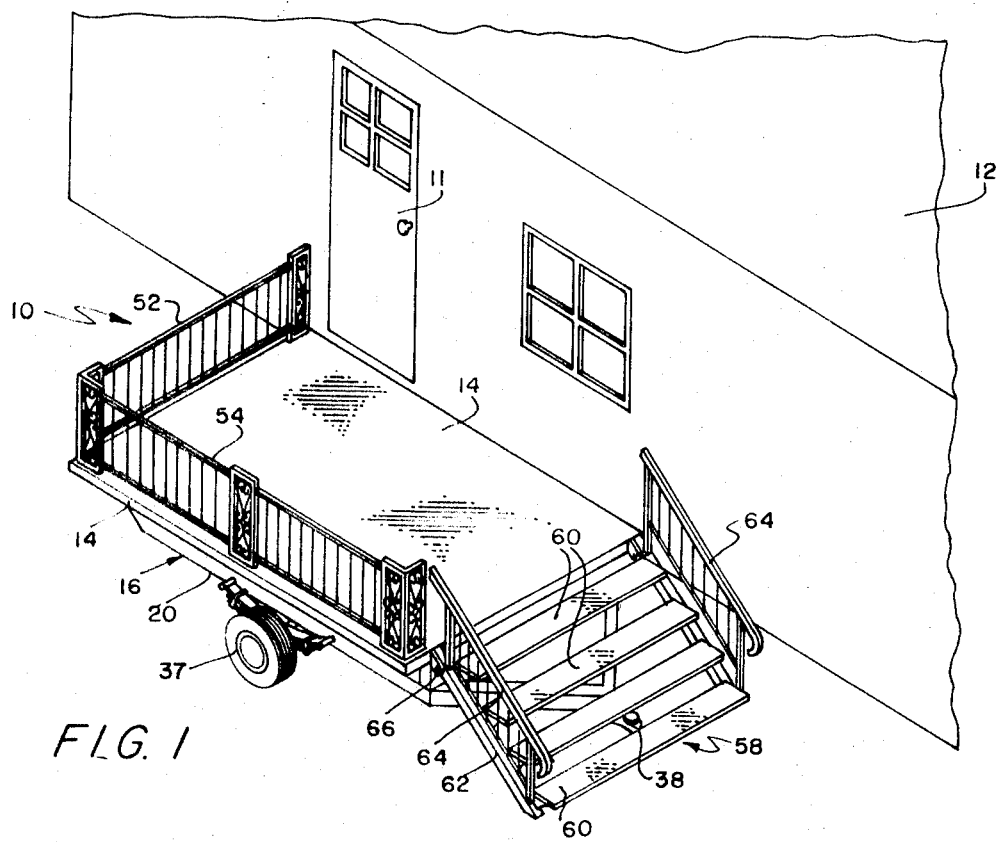
FIG. 1 is a perspective view of the porch in position adjacent a mobile home.
Figure 4:
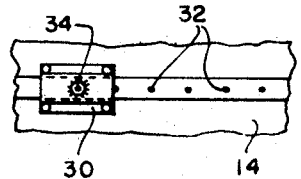
FIG. 4 is a fragmentary view of the under side of the deck.

Referring to the drawings for a detailed description of the invention and more specifically to FIG. 1, the mobile porch trailer is generally identified by reference numeral 10, positioned in place adjacent a conventional mobile home trailer 12. The porch trailer 10 includes a flat deck 14 supported on a steel frame structure 16 which provides the structural integrity to the overall porch trailer 10. The frame 16 is of a welded construction, the sides of the frame are made up of upper and lower longitudinal members 18 and 20 respectively, held in spaced apart relation by forward and rearward vertical members 22 and 24 respectively, all of which have a box section. The sides of the frame structure are held in spaced apart relation by lateral frame members 26 and 28. The deck 14 is attached to the frame structure 16 by bracket members 30 which surround the lateral members 28. The lateral frame members 28 have a series of longitudinally spaced holes 32 therein, as seen in FIG. 4, for receipt of locking pins 34 which pass through the brackets 30, allowing the deck to be adjustably positioned laterally with respect to the frame 16 of the trailer.

Attached to the trailer frame 16 is a conventional single axle 35 having conventional springs 36 and rubber tired wheels 37. Extending from the forward end of lower longitudinal members 20 is a conventional hitch yoke structure 38 having an adjustable height support wheel 39 which is retracted during transit. Enclosing the bottom of the frame structure 16 is a bottom panel 42, while the sides of the frame are enclosed by side panels 44. Located at the rear of the frame structure is a pivotally mounted door 46 allowing access to the storage compartment 48 within the frame structure 16. Located at the forward end of the frame structure is a second pivotally mounted door 50 providing a secondary means of access to compartment 48. Surrounding the porch deck 14 are removable railing sections 52 and 54 which have extension portions 56 which extend into the porch deck 14.

Figure 2:
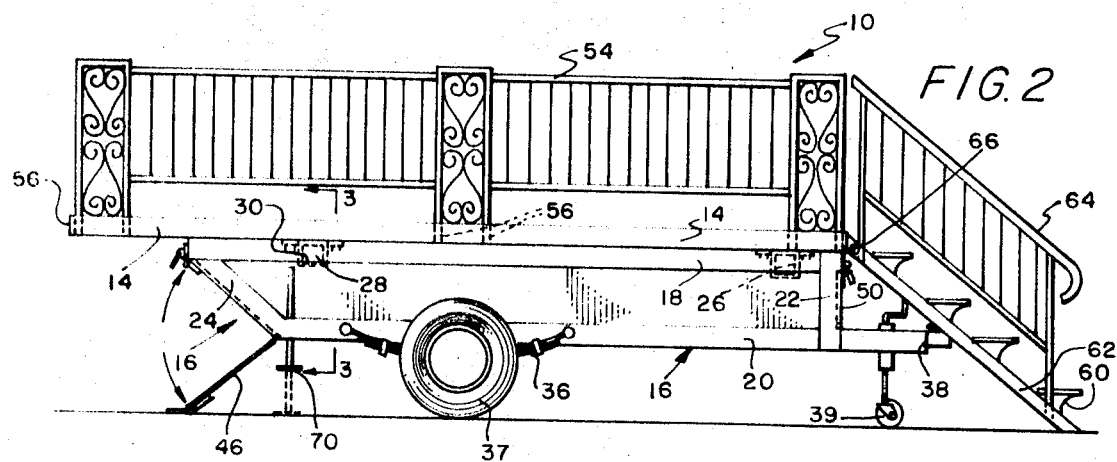
FIG. 2 is a side elevational view of the porch trailer.
Figure 5:
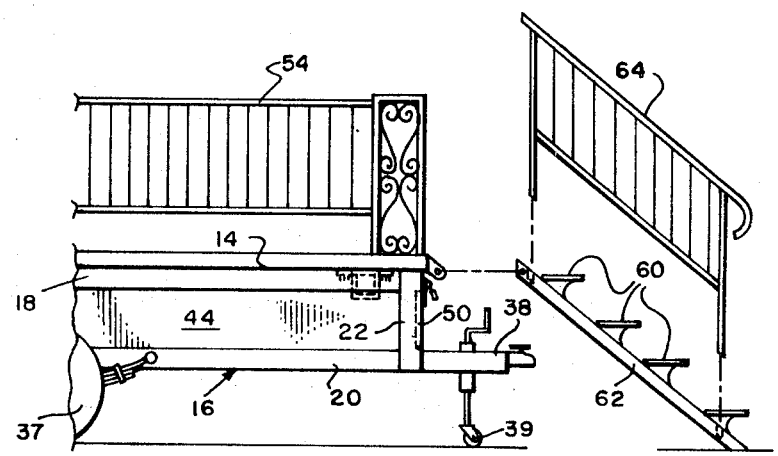
FIG. 5 is a fragmentary exploded view of the trailer and its accompanying steps and railing.
Figure 6:
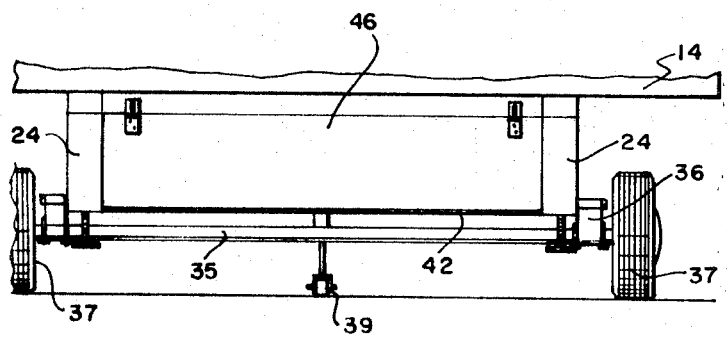
FIG. 6 is a rear end view of the trailer.
Figure 7:
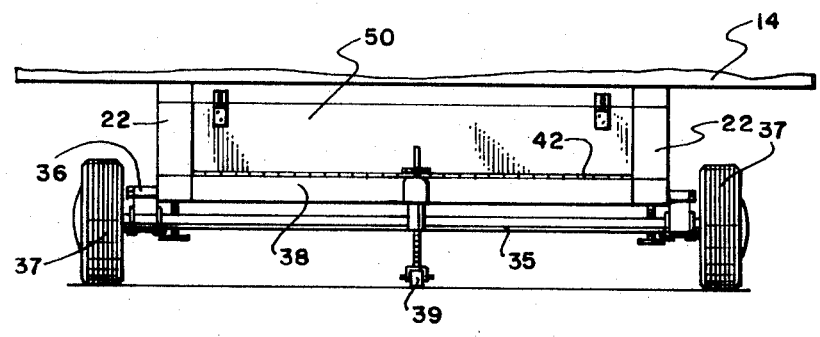
FIG. 7 is a front end view of the trailer.

Pivotally attached to the front end of the porch deck is a stair structure 58 which includes step treads 60, side members 62 and hand railings 64. The step structure 58 is pivotally mounted to the deck by bolt members 66 which can be readily removed for storage, as seen in FIG. 5. Positioned at the two rear corners of the frame structure 16 are mechanical jack members 70 (FIG. 2) which are utilized to support the frame once the porch trailer 10 is in its stationary position. While not shown, an additional pair of jack members 70 could be located at the forward corners of the frame structure 16 in place of the hitch support wheel 39.

OPERATION

When the porch trailer is in its mobile configuration for travel on the highways, the deck 14 is centrally positioned with respect to the frame member 16 in a locked position by bolts 34. The rear porch railing 52 and side railings 54 function as removable trailer sides for confining the load carried on the trailer. The step structure 58 can also be used as a trailer side when the hand rails 64 are removed and the step structure 58 is pivoted upward to a locked vertical position, not shown in the drawings. The porch trailer 10 has an additional enclosed storage compartment 48 centrally disposed within the frame structure 16 which can be reached through doors 46 and 50 located at the front and rear of the trailer.

Figure 3:
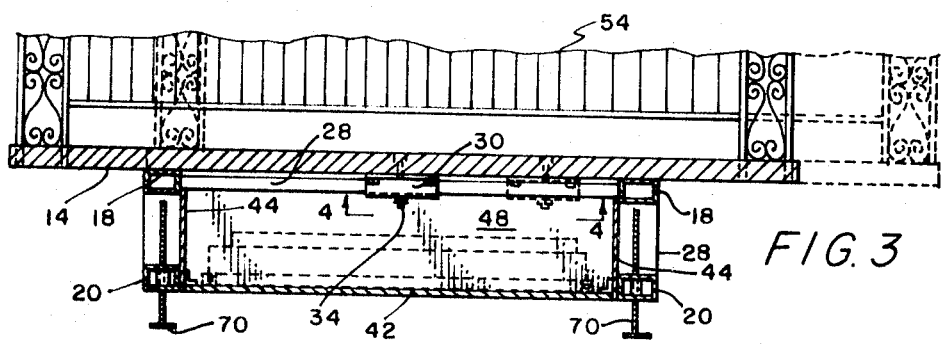
FIG. 3 is a sectional view taken along lines 3 — 3 of FIG. 2.

When the mobile home 12 and accompanying trailer 10 reach the home site, the mobile home is first leveled and blocked at its various supporting points so that the load is removed from the wheels. The porch trailer 10 is then pulled along side the door 11 of the mobile home in fairly close proximity thereto. The locking pins 34 are then removed and the porch deck 14 is slid laterally on the frame structure 16 to the dotted line position, as seen in FIG. 3. Once the edge of the deck comes in contact with the mobile home, the locking pin 34 is again inserted in bracket 30 to hold the deck rigidly in place. The jacks 70 are then adjusted to level the porch deck and vertically position it with respect to the vertical height of the mobile home door 11. The step structure is then pivoted downward into contact with the ground and the hand railings 64 are positioned at each side thereof to provide a completed structure. While not shown in the drawings, an apron wall can be placed around the periphery of the deck 14 so as to hide the frame structure 16 and wheels 37 of the trailer from view, as quite often done with mobile homes. While not shown in the drawings, a porch roof can also be placed above the deck 14, held in place by a modified form of railing sections 54. When in the stationary position, the compartment 48 provides an additional weather proof storage compartment which is normally in great need with mobile homes.

Having described the invention with sufficient clarity to enable those familiar with the art to construct and use it, I claim:

1. A portable porch for use with mobile homes when stationary, and as a trailer when in transit comprising:
    a flat deck;
    a rectangular frame structure supporting the deck, including longitudinal members and lateral members;
    at least one wheel carrying axle and hitch means carried by said frame;
    coupling means attaching the deck to the lateral members of the frame allowing the deck to slide laterally on the frame; and
    releasable locking means holding the deck from sliding on the lateral members during transit of the portable porch.

2. A portable porch as set forth in claim 1, including removable railing means positioned around the periphery of said deck which also functions as trailer sides.

3. A portable porch as set forth in claim 1, wherein the coupling means is a bracket fastened to the deck having an opening therein allowing the lateral members to slide therethrough.

4. A portable porch as set forth in claim 1, wherein the coupling means is a bracket fastened to the deck having an opening therein allowing the lateral members to slide therethrough, the lateral members being positioned at the front and rear of the deck in supporting relation thereof.

5. A portable porch as set forth in claim 1, wherein the frame structure has a three dimensional box shape and is enclosed on all sides and bottom by wall panels to form a storage compartment within the frame structure.

6. A portable porch as set forth in claim 1, including a step means pivotally attached to the edge of the deck whereby the step means can be pivoted downward until it contacts the ground.

7. A portable porch as set forth in claim 1, wherein the coupling means is a bracket fastened to the under side of the deck having an opening therein allowing the lateral members to slide therethrough, the releasable locking means being integral with said coupling means for holding the deck from sliding on the lateral members during transit of the portable porch.

8. A portable porch as set forth in claim 1, wherein the frame structure has a three dimensional box shape having upper and lower longitudinal members spaced apart by vertical frame members.

* * * * *